United States Patent [19]
Chodha et al.

[11] Patent Number: 5,985,970
[45] Date of Patent: Nov. 16, 1999

[54] EPDM RUBBER COMPOSITION

[75] Inventors: Charanjit Singh Chodha, Leicester, United Kingdom; Julian Marshall Mitchell, North Haven, Conn.

[73] Assignee: Uniroyal Chemical Company, Inc., Middlebury, Conn.

[21] Appl. No.: 08/688,827

[22] Filed: Jul. 31, 1996

Related U.S. Application Data

[63] Continuation of application No. 08/504,974, Jul. 20, 1995, abandoned.

[51] Int. Cl.$^6$ ........................................................ C08J 5/54
[52] U.S. Cl. .......................... 524/269; 524/425; 524/430; 524/432
[58] Field of Search ..................................... 524/269, 425, 524/430, 432

[56] References Cited

U.S. PATENT DOCUMENTS

| | | | |
|---|---|---|---|
| 4,341,675 | 7/1982 | Nakamura | 524/266 |
| 4,808,643 | 2/1989 | Lemoine et al. | 524/254 |
| 4,882,387 | 11/1989 | Tobing | 524/232 |
| 5,314,752 | 5/1994 | Bova et al. | 524/232 |

*Primary Examiner*—Peter D. Mulcahy
*Attorney, Agent, or Firm*—Daniel Reitenbach

[57] ABSTRACT

An EPDM rubber composition useful for producing a tack-free crosslinked EPDM rubber product which composition consists of:
  i) at least one EPDM terpolymer;
  ii) at least one silicone-modified EPDM elastomer;
  iii) an organic peroxide; and
  iv) optionally, at least one tack-neutral additive.

16 Claims, 1 Drawing Sheet

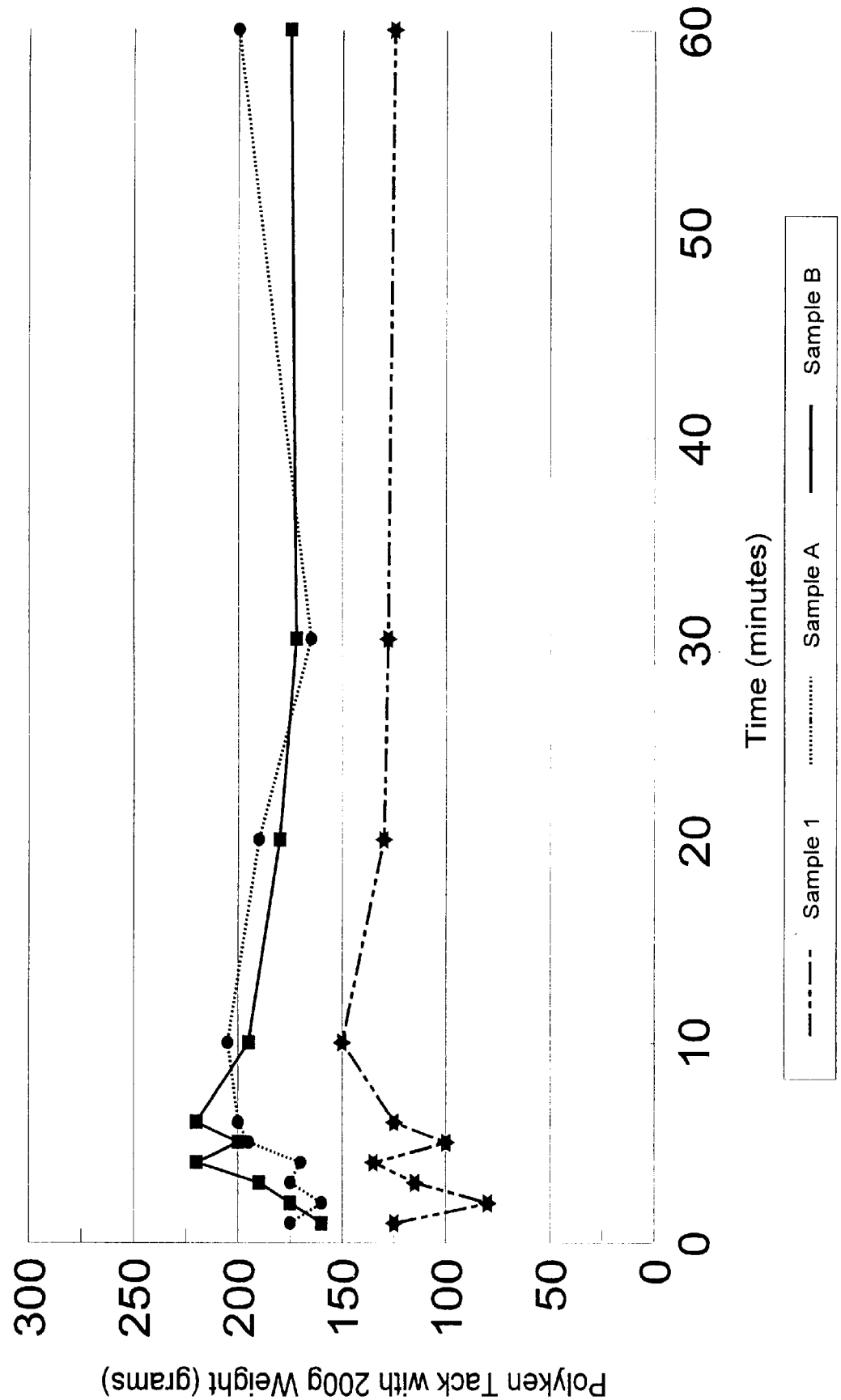

EPDM RUBBER COMPOSITION

This is a Continuation of application Ser. No. 08/504,974, filed Jul. 20, 1995 now abandoned.

FIELD OF THE INVENTION

The present invention relates to a EPDM rubber composition consisting of an EPDM terpolymer, a silicone-modified EPDM elastomer, and an organic peroxide. The present invention also relates to a process for producing a crosslinked EPDM rubber product with a tack-free surface.

BACKGROUND OF THE INVENTION

Rubber articles vulcanized using peroxides instead of sulfur as crosslinking agents possess certain advantageous properties such as superior heat resistance, compression set and electrical insulation for molded articles, and increased stability in compounding with colored substances.

Vulcanization with peroxides, however, is hindered by oxygen. If vulcanization with peroxides is carried out in the presence of air, crosslinking can proceed inadequately on the surface of the rubber article. Inadequate crosslinking can lead to surface defects such as unacceptable tackiness, reduction in strength, or insufficient hardness which can result in performance problems of the rubber article such as poor wear resistance, mar resistance, and slipperiness.

As a result, vulcanization of rubber with peroxides has generally been conducted in environments shielded from air such as in process for press molding, injection molding, or transfer molding. For fabricating hoses and electric wires using an autoclave cure, air has been replaced with steam.

Methods have been described in the art for preventing the tackiness of surfaces of peroxide-cured rubber articles exposed to air during vulcanization. Many of these methods require subjecting the article to surface-treatment compositions, which impart a non-tacky and water-repellent film on the surface of the article. Surface treatment of peroxide-cured EPDM articles is described, for example, in European Patent Application 482,480 A1 and U.S. Pat. No. 4,491,653.

U.S. Pat. No. 5,213,723 describes a method for preparing a peroxide-cured rubber product in the presence of oxygen using electron beams to irradiate the cured rubber product. U.S. Pat. No. 4,983,685 describes a method for preparing a peroxide-cured rubber product in the presence of oxygen by incorporating an antioxidant into the rubber product prior to curing.

It is an object of this invention to provide an EPDM rubber composition which can be cured with organic peroxides in the presence of oxygen to produce an EPDM rubber product that exhibits a tack-free surface.

SUMMARY OF THE INVENTION

The present invention is directed to an EPDM rubber composition useful for producing a tack-free crosslinked EPDM rubber product which consists of:
 i) at least one EPDM terpolymer;
 ii) about 8 phr to about 80 phr of at least one silicone-modified EPDM elastomer;
 iii) about 1 phr to about 10 phr of an organic peroxide; and
 iv) optionally, about 50 phr to about 250 phr of at least one tack-neutral additive.

BRIEF DESCRIPTION OF THE FIGURE

FIG. 1 graphically depicts the measurement of the tack of Example 1 and Comparative Examples A and B, at various time intervals after curing.

DETAILED DESCRIPTION OF THE INVENTION

For the purposes of this invention, the term "phr" means parts per hundred parts of EPDM terpolymer.

For the purposes of this invention, the term "EPDM terpolymer" means a terpolymer as defined in ASTM-D1418-64 containing ethylene and propylene in its backbone and diene in the side chain. Methods for the preparation of EPDM terpolymers are well known. The preferred EPDM terpolymer comprises about 50 to about 80 weight percent ethylene and about 0.5 to about 20 weight percent of a diene monomer, with the balance of the EPDM terpolymer being propylene. The diene monomer is preferably a non-conjugated diene, such as, for example, 1,4-hexadiene, dicyclopentadiene, ethylidene norbornene, and the like. 5-Ethylidene-2-norbornene (ENB) is a preferred diene monomer. Preferably, in the EPDM terpolymer, ENB is present in an amount ranging from about 4 to about 15 weight percent; ethylene is present in an amount ranging about 58 to about 75 weight percent; and propylene is present in an amount ranging from about 25 to about 42 weight percent.

The EPDM terpolymers useful in this invention have a number average molecular weight (Mw) of about 50,000 to about 1,000,000, preferably about 80,000 to about 750,000, and most preferably, about 100,000 to about 720,000. The Mooney viscosity (ML, 1+4 @ 125° C.) of the EPDM terpolymer is about 30 to about 110, preferably about 50 to about 100, and most preferably, about 60 to about 90.

EPDM terpolymers useful in the composition of this invention are well known and commercially available, e.g., from Uniroyal Chemical Company, Inc. under the tradename of Royalene®, such as Royalene® 3345, Royalene® 501, Royalene® 637P, and Royalene® 512.

For the purposes of this invention, the term "silicone-modified EPDM elastomer" means a compatilized blend of EPDM and silicone gum.

Examples of silcone-modified EPDM elastomers include Royaltherm® 650P and Royaltherm® 1637P, silicone-modified EPDM high performance elastomers commercially available from Uniroyal Chemical Company, Inc.

A preferred amount of silicone-modified EPDM elastomer is from about 10 phr to about 60 phr; most preferably, from about 15 to about 50 phr.

Several peroxide compounds are known in the art as useful for vulcanizing rubber. Peroxides useful in the composition of this invention must be stable and processable under ordinary temperatures and conditions of rubber processing. Examples of such peroxides include dicumyl peroxide, 1,3-bis(t-butylperoxyisopropyl)benzene, 2,5-dimethyl-2,5-di(t-butylperoxy)hexane, 1,1-di-t-butylperoxy-3,3,5-trimethylcyclohexane, cumene hydroperoxide, di-t-butyl peroxide, t-butylcumyl peroxide, p-chlorobenzoyl peroxide, t-butyl peroxybenzoate, and t-butylperoxyisopropyl carbonate. A preferred organic peroxide is dicumyl peroxide.

The amount of peroxide present in the composition of this invention will vary depending on the desired mechanical properties of the cured EPDM rubber article. For example, higher levels of peroxide can yield improved mechanical properties. Preferably, the amount of active peroxide in the composition is about 2 phr to about 6 phr; most preferably, about 3 phr to about 5 phr.

Many peroxides used for vulcanizing rubber are provided and used on inert carriers such as clay, calcium carbonate, carbon black or binder. An example of this is DiCup 40KE, which is 40% active dicumyl peroxide on a carrier.

Besides containing the EPDM terpolymer, the silicone-modified EPDM elastomer, and the peroxide, the composition of the present invention may consist of one or more tack-neutral additives. For the purposes of this invention, the term "tack-neutral additive" means an additive which has no inhibiting effect upon the surface tack of crosslinked EPDM rubber products produced by vulcanizing the composition of this invention in the presence of oxygen. Such additives include reinforcing fillers such as carbon black, talc, clay, calcium carbonate and silica, process oils, processing aids useful in improving the dispersibility of the fillers during mastication, activators such as metal oxides, accelerators, pigments, foaming agents, foaming aids, dessicants, and the like. The wide variety and choice of these type materials are well-known and available to those familiar with the art of rubber compounding.

The types and amounts of these tack-neutral additives and the peroxide used as a crosslinking agent can be selected and determined in accordance with the specific properties desired in the final EPDM rubber product.

The composition of the present invention may be prepared by blending the EPDM terpolymer, the silicone-treated EPDM elastomer, the peroxide and the optional tack-neutral additives, in a suitable mixing device such as a Banbury mixer, a kneader, or a roll. The resulting mixed composition can then subsequently be molded by means of a calendar roll or an extruder.

The composition of the present invention is useful in the preparation of EPDM rubber products such as hoses, rubber sheets, roofing sheets, canvas sheets, weatherstrips, sealing sponge, protector tubes, protector sponges, and other such objects. The EPDM rubber products produced from the composition of the present invention are not sticky on the surface and exhibit excellent tensile properties.

The following examples are provided to illustrate the present invention.

EXAMPLES

The following is a description of the procedure used to quantitatively measure tack in the cured rubber samples of the examples below.

Each sample was cured at 375° F. for 5 minutes. Tack was measured on a Polyken® probe tack tester (available from Testing Machines Inc., Mineola, Long Island, N.Y.) after various time intervals upon removal of the sample from the oven. These times varied from 30 seconds to 96 hours. A 200 g weight was placed on the backing side of each sample when the tack was tested. This was done to help enhance the tack up to a measurable range and also to help eliminate any effects on tack caused by the deformation of the rubber during the curing process.

Example 1 and Comparative Examples A, B and C

Employing the ingredients indicated in Table 1 (which are listed in parts per hundred of EPDM terpolymer by weight), several rubber compositions were compounded in the following manner: the EPDM terpolymers and the silicone-modified EPDM elastomers were added to a laboratory Banbury mixer. The zinc oxide, carbon black N-650, parafin oil (Sunpar 2280), antioxidant (Vulkanox MB2), activator (SR-350) and desiccant (Rhensorb 4GW), were then added to the Banbury mixer. The resultant composition was mixed until all the materials were incorporated and thoroughly dispersed and discharged from the mixer. Discharge temperatures of about 200–310° F. were used. The peroxide curative (DiCup 40KE) was then added to the composition either on the mill or in a second cycle in the Banbury mixer. The second cycle was shorter and the discharge temperature was maintained below 240° F.

This compounded composition was then sheeted out and samples were cut for cure and subsequent tack measurements. The samples were cured for ten minutes at 350° F. and their physical properties evaluated. The results of such testing are summarized in Tables 2 and 3 below and in FIG. 1. Tensile Strength, Elongation, and Modulus were measured following procedures described in ASTM D412. Tack measurements were made using the procedure described in ASTM 2979-88.

Certain of the samples were measured for tack using the Polyken method as described above. These results are presented graphically in FIG. 1.

Tack in other samples was assessed qualitatively. The qualitative tack measurements were made by investigating the surface of each test material when touched by a glove. If the glove made no impression on the surface, the material was deemed to be not tacky. If there was a slight marking, the material was deemed to have slight tack. If the glove left a deep impression, the material was deemed to be very tacky. The results of this qualitative assessment of Example 1 and Comparative Examples A, B and C, are presented in Table 3.

Example 1 illustrates the compositions of the present invention. Comparative Example A is a control sample. Comparative Example B is a composition in which a selected antioxidant (Vulkanox MB-2) was evaluated in an EPDM sample and evaluated for tack. Comparative Example C is a composition in which a selected antioxidant (Vulkanox MB-2) was evaluated in an EPDM/silicone-modified EPDM sample and evaluated for tack.

TABLE 1

| COMPOSITION INGREDIENTS | | | | |
|---|---|---|---|---|
| Example | A | B | C | 1 |
| Royalene 3345 | 135 | 135 | 105 | 105 |
| Royalene 501 | 25 | 25 | 25 | 25 |
| Royaltherm 650P | — | — | 45 | 45 |
| Zinc Oxide | 5 | 5 | 5 | 5 |
| Carbon Black N-650 | 85 | 85 | 85 | 85 |
| Sunpar 2280[1] (Parafin Oil) | 10 | 10 | 10 | 10 |
| Vulkanox MB2[2] (Antioxidant) | — | 5 | 5 | — |
| SR-350[3] | 2 | 2 | 2 | 2 |
| DiCup 40KE[4] (Peroxide) | 8 | 8 | 8 | 8 |
| Rhenosorb CW/C[5] (Dessicant) | 10 | 10 | 10 | 10 |

[1]Sunpar 2280 is a trademark of RE Carroll, Inc.
[2]Vulcanox MB2 is blend of 4- and 5-methylmercapto-benzimidazole; Vulcanox is a trademark of Mobay Corporation
[3]SR-350 is trimethylolpropane trimethacrylate obtained from Sartomer Company
[4]DiCup 40KE is ducumyl peroxide obtained from Hercules, Inc.
[5]Rhenosorb is a trademark of Rhein Chemie GmbH

TABLE 2

Cured Physical Properties of Compositions A, B, C and 1
Measured as described in ASTM Method D412-92

| Example | A | B | C | 1 |
|---|---|---|---|---|
| Mooney Viscosity (ML 1 + 4 @ 100° C.) | 76 | 82 | 75 | 73 |
| Mooney Scorch (MS @ 270° C.) | 7.86 | 7.71 | 8.15 | 9.56 |
| Rheometer @ 350° F. 50 Range | | | | |
| Torque ML[1] | 7.28 | 7.81 | 7.3 | 6.69 |
| Torque MH[1] | 29.56 | 29.68 | 28.35 | 26.52 |
| Time Ts1[2] | 0.73 | 0.74 | 0.77 | 0.84 |
| Time Tc90[3] | 4.0 | 4.0 | 3.97 | 3.81 |
| CURED 10' @ 350° F. - UNAGED PHYSICAL PROPERTIES | | | | |
| 100% Modulus | 230 | 250 | 240 | 220 |
| 300% Modulus | 1150 | 1010 | 940 | 890 |
| Tensile Strength, psi | 2130 | 2040 | 1960 | 1910 |
| % Elongation | 470 | 520 | 540 | 520 |
| Hardness, Duro A | 48 | 50 | 50 | 47 |

[1]ML and MH are the lower and upper measurements, respectively, for viscosity at 350° F.
[2]Ts1 is the measurement of the amount of scorch after one minute
[3]Tc90 is the time to 90% cure, in minutes.

TABLE 3

ASSESSMENT OF TACK AT 400° F. CURE TEMPERATURE
WITH HOT AIR AND 4 kw MICROWAVE POWER
Example

| A | B | C | 1 |
|---|---|---|---|
| Slight tack; glove marking | very slight tack | No tack | No tack |

Comparative Example B, with antioxidant added to the EPDM composition without any silicone-modified EPDM elastomer, reduced the surface oxidation (tackiness) compared to Comparative Example A but did not eliminate it completely.

For further comparative purposes, Comparative Example C included 5 parts of Vulkanox MB-2in the EPDM composition containing both EPDM terpolymer and silicon-modified EPDM elastomer to ascertain if its addition had impact on tack. There was no difference in tack noted between Example 1 (a composition according to the present invention) and Comparative Example C, since they were both tack-free.

FIG. 1 graphically depicts the measurement of the tack of Example 1 and Comparative Examples A and B, at various time intervals after curing. There is a notable improvement in the tack in Example 1 compared to the tack in Comparative Examples A and B.

What is claimed is:

1. A method for preparing an EPDM rubber composition curable to a tack-free rubber, which method consists of mixing, in the presence of about 1 phr to about 10 phr of an organic peroxide:

i) at least one unmodified EPDM terpolymer;

ii) about 8 phr to about 80 phr of at least one silicone-modified EPDM elastomer; and iii) one or more tack-neutral additives.

2. An EPDM rubber composition prepared according to the method as recited in claim 1.

3. An EPDM rubber composition as recited in claim 2 consisting of about 10 phr to about 60 phr of the silicone-modified EPDM elastomer.

4. An EPDM rubber composition as recited in claim 3 consisting of about 15 phr to about 50 phr of the silicone-modified EPDM elastomer.

5. An EPDM rubber composition as recited in claim 2 consisting of about 2 phr to about 6 phr of the organic peroxide.

6. An EPDM rubber composition as recited in claim 5 consisting of about 3 phr to about 5 phr of the organic peroxide.

7. An EPDM rubber composition as recited in claim 2 wherein the organic peroxide is selected from the group consisting of dicumyl peroxide, 1,3-bis(t-butylperoxyisopropyl)benzene, 2,5-dimethyl-2,5-di(t-butylperoxy)hexane, 1,1-di-t-butylperoxy-3,3,5-trimethylcyclohexane, cumene hydroperoxide, di-t-butyl peroxide, t-butylcumyl peroxide, p-chlorobenzoyl peroxide, t-butyl peroxybenzoate, and t-butylperoxyisopropyl carbonate.

8. An EPDM rubber composition as recited in claim 7 wherein the organic peroxide is dicumyl peroxide.

9. An EPDM rubber composition as recited in claim 2 wherein the tack-neutral additive is a metal oxide.

10. An EPDM rubber composition as recited in claim 9 wherein the metal oxide is zinc oxide.

11. An EPDM rubber composition as recited in claim 2 wherein at least one tack-neutral additive is a reinforcing filler.

12. An EPDM rubber composition as recited in claim 11 wherein the reinforcing filler is selected from the group consisting of carbon black, talc, clay, calcium carbonate and silica.

13. An EPDM rubber composition as recited in claim 2 wherein at least one tack-neutral additive is a processing oil.

14. An EPDM rubber composition as recited in claim 2 wherein at least one tack-neutral additive is a desiccant.

15. An EPDM rubber composition as recited in claim 2 wherein the tack-neutral additive is a combination of a metal oxide, a reinforcing filler, a processing oil and a desiccant.

16. An EPDM rubber composition as recited in claim 2 consisting of more than one unmodified EPDM terpolymer.

* * * * *